(12) United States Patent
Omesti et al.

(10) Patent No.: US 9,995,407 B2
(45) Date of Patent: Jun. 12, 2018

(54) INTEGRATED SAFETY DEVICE FOR SELF-PROPULSION GAS SYSTEMS

(71) Applicants: EMER, S.P.A., Brescia (IT); WESTPORT POWER INC., Vancouver (CA)

(72) Inventors: Giulia Omesti, Brescia (IT); Roberto Defilippi, Brescia (IT); Soroush Farzin, Livonia, MI (US); Giulio Brizzolari, Brescia (IT)

(73) Assignees: WESTPORT POWER INC., Vancouver (CA); EMER, S.P.A., Brescia (IT)

( * ) Notice: Subject to any disclaimer, the term of this patent is extended or adjusted under 35 U.S.C. 154(b) by 107 days.

(21) Appl. No.: 14/855,121

(22) Filed: Sep. 15, 2015

(65) Prior Publication Data
US 2016/0040796 A1    Feb. 11, 2016

Related U.S. Application Data

(63) Continuation of application No. PCT/IB2014/059808, filed on Mar. 14, 2014.
(Continued)

(30) Foreign Application Priority Data

Mar. 27, 2013    (IT) .............................. BS2013A0039

(51) Int. Cl.
  *F16K 17/40*    (2006.01)
  *F16K 17/00*    (2006.01)
  (Continued)

(52) U.S. Cl.
  CPC ............ *F16K 17/003* (2013.01); *F16K 17/16* (2013.01); *F16K 17/38* (2013.01); *F16K 17/383* (2013.01);
  (Continued)

(58) Field of Classification Search
  CPC .. F16K 37/0068; F16K 37/0058; F16K 13/04; F16K 17/003; F16K 17/403;
  (Continued)

(56) References Cited

U.S. PATENT DOCUMENTS 3,626,474 A    12/1971    Hammer
3,844,310 A *  10/1974   Brindisi .................. F16K 17/04
                                                              137/467
(Continued)

FOREIGN PATENT DOCUMENTS

EP    2720022 A1    4/2014
GB    2 078 479 A   6/1982
WO    2012114358 A1 8/2012

OTHER PUBLICATIONS

Chinese Office Action, dated Dec. 28, 2016, for Chinese Application No. 201480014228, 13 pages. (with English Translation).
(Continued)

*Primary Examiner* — Minh Le
(74) *Attorney, Agent, or Firm* — Seed IP Law Group LLP

(57) ABSTRACT

A safety device for a cylinder holding gaseous fluids under pressure is disclosed. The safety device has a device body in which a passage is defined for a fluid; the passage extends from an entry aperture, suitable for being placed in fluidic communication with a cylinder, to an exit aperture. An obturator air tightly engages the passage, the obturator is movable from a first position, in which it indicates the presence of fluid at a pressure below a first predefined pressure threshold value, inside the cylinder, and a second position, in which it indicates the presence of fluid at a pressure above the first predefined pressure threshold value inside the cylinder. At least one temperature and/or pressure-sensitive relief device is positioned in the obturator in such a way that, upon exceeding a predefined temperature threshold or upon exceeding a second predefined pressure thresh-
(Continued)

old, the relief device opens the passage for the fluid and permits the flow of fluid from the entry aperture towards the exit aperture.

20 Claims, 3 Drawing Sheets

Related U.S. Application Data

(60) Provisional application No. 61/802,026, filed on Mar. 15, 2013.

(51) Int. Cl.
*F17C 13/04* (2006.01)
*F16K 17/16* (2006.01)
*F16K 17/38* (2006.01)
*F16K 37/00* (2006.01)

(52) U.S. Cl.
CPC ............ *F16K 17/40* (2013.01); *F16K 17/403* (2013.01); *F16K 37/0008* (2013.01); *F16K 37/0058* (2013.01); *F17C 13/04* (2013.01); F17C 2205/0314 (2013.01); F17C 2205/0332 (2013.01); F17C 2205/0382 (2013.01); F17C 2205/0394 (2013.01); F17C 2221/033 (2013.01); F17C 2221/035 (2013.01); F17C 2223/0123 (2013.01); F17C 2223/0153 (2013.01); F17C 2223/033 (2013.01); F17C 2223/035 (2013.01); F17C 2223/036 (2013.01); F17C 2260/021 (2013.01); F17C 2260/023 (2013.01); F17C 2270/0168 (2013.01)

(58) Field of Classification Search
CPC ........ F16K 17/383; F16K 17/38; F16K 17/40; F16K 17/16; F17C 2221/033; F17C 2221/035; F17C 2205/0332; F17C 2205/0382; F17C 2205/0394; F17C 2205/0314; F17C 2223/036; F17C 2223/033; F17C 2223/0123; F17C 2223/0153; F17C 2260/023; F17C 2260/021; F17C 2270/0168
USPC ........ 137/68.11, 68.12, 68.19, 68.23, 72, 74, 137/75, 76
See application file for complete search history.

(56) References Cited

U.S. PATENT DOCUMENTS

| | | | |
|---|---|---|---|
| 4,232,698 A | 11/1980 | Hosterman et al. | |
| 4,365,643 A * | 12/1982 | Masclet | B60C 23/20 116/218 |
| 4,366,837 A | 1/1983 | Roettgen | |
| 4,499,846 A * | 2/1985 | Bergeron | B60C 23/0496 116/272 |
| 5,027,740 A * | 7/1991 | Kramer | B60C 23/0496 116/272 |
| 5,071,066 A * | 12/1991 | Willson | F16K 17/003 137/542 |
| 5,213,128 A * | 5/1993 | Baird | F16K 17/16 137/68.23 |
| 5,542,445 A * | 8/1996 | Adams | F16K 17/36 137/68.12 |
| 5,632,297 A * | 5/1997 | Sciullo | A61M 16/0825 137/72 |
| 6,112,619 A * | 9/2000 | Campbell | F16K 31/60 116/277 |
| 6,229,447 B1 | 5/2001 | Hand et al. | |
| 6,481,459 B2 * | 11/2002 | Fukano | F16K 37/0058 137/553 |
| 6,655,316 B2 * | 12/2003 | Kerger | F16K 17/0413 116/272 |
| 6,814,097 B2 * | 11/2004 | Girouard | F16K 17/04 137/72 |
| 7,043,992 B2 * | 5/2006 | Bernhard | G01L 19/12 73/705 |
| 7,971,798 B2 * | 7/2011 | Pechtold | F16K 17/003 137/457 |
| 8,191,574 B1 * | 6/2012 | Davis | F16K 1/302 116/227 |
| 8,225,816 B2 * | 7/2012 | Denis | F16K 1/306 137/505.25 |
| 8,327,868 B2 * | 12/2012 | Lammers | F16K 1/307 137/74 |
| 8,869,829 B2 * | 10/2014 | Hasegawa | F16K 37/0058 137/524 |
| 9,109,711 B2 * | 8/2015 | Mattson | F16K 37/0008 |
| 9,134,203 B2 * | 9/2015 | Smith | G01N 1/10 |
| 9,239,271 B2 * | 1/2016 | Downie | G01L 9/0022 |
| 9,546,742 B2 * | 1/2017 | Brown | F16K 37/0058 |
| 2003/0041899 A1 | 3/2003 | Frank | |
| 2006/0231013 A1 * | 10/2006 | Lane | G01L 7/166 116/272 |
| 2012/0138563 A1 * | 6/2012 | Brumfield | B65D 51/18 215/230 |
| 2014/0102354 A1 * | 4/2014 | Mayr | G01L 19/0618 116/212 |

OTHER PUBLICATIONS

International Search Report dated May 28, 2014, for corresponding International Application No. PCT/IB2014/059808 dated Jun. 27, 2014, 3 pages.
Chinese Search Report, dated Dec. 20, 2016, for Chinese Application No. 2014800142284 (with English Translation), 4 pages.

* cited by examiner

INTEGRATED SAFETY DEVICE FOR SELF-PROPULSION GAS SYSTEMS

FIELD OF INVENTION

The present invention relates in general to self-propulsion gas systems using compressed natural gas, liquefied petroleum gas or other gaseous combustibles contained under pressure in a cylinder or container, and relates in particular to an integrated safety device for such systems.

BACKGROUND OF THE INVENTION

In motor vehicles with engines which can be gas fuelled, the gaseous fuel is loaded and compressed in at least one cylinder or container. Pursuant to some safety regulations of the trade considered here, each gas cylinder on board a vehicle should be fitted with relief devices to discourage an undesirable combustive event if increases in internal pressure and/or temperature beyond a predefined threshold occur.

Each cylinder is fitted with a shut-off valve to stop flow into and out of the cylinder. Various types of cylinder valves are known which integrate several components, these valves are known as multipurpose valves. Generally speaking, such multipurpose valves comprise the aforementioned safety means and other devices pursuant to international regulations in the sector, such as for example, the excess flow device (EFD) which triggers to limit the exit of gas from the cylinder in the case of a difference of internal and external pressure above a predefined value. The excess flow device is fitted in the main duct through which the gas transits, while the pressure and temperature sensitive relief devices are directly connected with the inside of the cylinder and thus positioned at the end part of secondary ducts.

As such, the relief devices are of two types, namely those which are triggered by temperature and those which are triggered by pressure. Both are positioned along a gas release duct of the cylinder, to close the release duct in normal operating conditions.

The relief devices which are triggered by temperature comprise a heat-sensitive element confined in a respective seat or chamber in a solid body in association with an expulsion plunger. The heat-sensitive element normally keeps the release duct closed and only changes its state when a predefined safety temperature threshold is reached. Such change to the state of the heat-sensitive element then allows the release duct to be opened to empty the cylinder. The pressure relief devices generally comprise a rupture disk or other element that keeps the release duct closed and ruptures or otherwise opens when a predefined pressure safety threshold is reached, opening the release duct to empty the cylinder.

In most self-propulsion gas systems both relief devices are used.

Returning now to the main duct through which the flow transits, the excess flow device is found upstream of the manually operated flow shut-off device and upstream of the electric flow shut-off device, if present. One consequence of this arrangement, pursuant to legislation, is that in the event of maintenance operations emptying of the cylinder is required or desired, the aperture of the manual shut-off device generates a pressure differential such as to cause the excess flow device to cut in with resulting closure of the transit of gas.

Currently the only solution for emptying the cylinder is the partial manual aperture of the shut-off device; the partial aperture in fact allows the gas to flow out of the cylinder without the pressure differential reaching the cut-in value set for the excess flow device.

This solution has drawbacks as regards safety however. In fact, if a maintenance technician attempts to empty the cylinder by fully opening the manual shut-off device, the subsequent triggering of the excess flow device blocks the transit of gas leading the technician to believe that the cylinder is completely empty when instead there is still pressurised gas present inside it. A subsequent removal of the cylinder valve with pressurised fluid still present therein can result in an undesirable combustive event.

To overcome this serious problem, a proposal to revise the American legislation ANSI NGV3.1 has been drawn up, the main requisites of which are i) the multipurpose valve or the tank should be provided with an indication of the presence of pressurized gas therein; and ii) in the case of maintenance the exit passage of the gas from the tank should not be interrupted by the excess flow device or other shut-off devices placed downstream of the excess flow device.

A temporary solution to respond to the first request has already been proposed. Such solution consists of applying a pressure gauge to the multipurpose valve; in particular the pressure gauge is connected to one of the secondary ducts mentioned above. This solution is not however sufficient to provide for adequate safety of the system. The pressure gauge is in fact a cumbersome instrument which may be damaged in the case of impact and being connected, as such, to one of the secondary passages communicating directly with the inside of the tank a leak due to damage of the pressure gauge cannot be stopped by other devices.

An object of the present invention is to provide a safety device suitable for overcoming the above mentioned drawbacks.

SUMMARY

The present safety device indicates whether the tank of a fluid is pressurised or not and which satisfies the above requisites of international legislation, and in particular which is associated to a passage communicating directly with the inside of the tank.

As explained above, the secondary passages present in a multipurpose valve and communicating directly with the tank are suitable for housing the pressure relief and thermic relief devices described above. The present safety device also indicates the presence of pressurised gas in the tank and which is combined with at least one of the two relief devices already present in the multipurpose valves. This way the current multipurpose valves do not need to be modified or the prior relief devices omitted.

The present safety device also makes it possible to limit the dimensions, the space occupied and the overall structure of the multipurpose valve to which it is associated.

For the same reasons, the present safety device provides a single integrated device comprising at least one safety device, a device suitable for indicating the presence of a pressurised fluid in the tank, and a manual shut-off device of the flow of gas. By means of the latter the cylinder can be emptied, by manual activation, through one of the secondary passages where the gas flows without intercepting the excess flow device.

At least some of the shortcomings and limitations of conventional safety devices are overcome by an integrated safety device, particularly for self-propulsion gas cylinders, according to claim 1. The dependent claims describe preferred embodiments of the present safety device.

In accordance with such claims, the present safety device comprises a device body in which a passage is defined for a fluid; the passage extends from an entry aperture, communicating with a container of the pressurised fluid, to an exit aperture, coming out for example in the atmosphere. In this disclosure an obturator is defined as an element of the disclosed safety device, that comprises a housing for at least one temperature and/or pressure sensitive relief device and that is movable within said safety device to provide a visual indication of the pressure within the cylinder or container. An obturator, for example can comprise a plunger, housed in an airtight manner in the body of the safety device wherein the plunger is movable between a first position, such as a rearward position, in which it finds itself at times when there is no pressurised gas inside the container of fluid (or the pressure is below a predefined threshold value) and a second position, such as an advanced position, in which it finds itself at times when there is pressurised gas inside the container of fluid (or at a higher pressure than the predefined threshold value).

A passage for the fluid is, in turn, defined in the obturator, suitable for placing in communication the entry aperture with the exit aperture, engaged so as to be airtight by at least one temperature and/or pressure sensitive relief device.

In the case of a heat-sensitive device, this engages the duct so as to close off the passage of gas until a predefined temperature threshold has been reached, beyond which the heat sensitive element inside it changes its state, permitting the passage of the fluid from the entry aperture to the exit aperture.

In the case of the pressure-sensitive element, such device is susceptible to rupture or otherwise open when the pressure difference between the entry aperture and the exit aperture exceeds a predefined value, so as to permit the flow of the fluid.

Consequently, the present device provides a signalling of the presence of pressurised fluid in the container or tank, in that it comprises a movable element whose change in position can be visibly appreciated.

For example, in a preferred embodiment, the obturator has a head which engages the exit aperture in such a way that when the obturator is in a rearward position, the head is hidden from sight, whereas when the obturator is in an advanced position, the head is visible from the outside.

In addition, the aim of being able to use such device in current multipurpose valves without foregoing one of the two relief devices of the known type is satisfied, without the need to modify the multipurpose valve and with the advantage of limiting the space occupied.

It is to be noted that the movable obturator acts in a continuous manner, depending on the pressure inside the container of fluid while the safety device acts only in the cases described and independently of the position of the movable obturator which it is housed in.

According to a preferred embodiment, the safety device further comprises a shut-off valve of the flow of fluid, for example manually activated, upstream of the obturator. The shut-off valve is, moreover, preferably positioned in such a way as not to interfere with the passage of gas between the entry aperture and the exit aperture and intercepts the flow in an auxiliary duct between the entry aperture and the exit aperture of the gas into the atmosphere. The arrangement permits total independence of the three devices and by means of such manual shut-off valve it is possible to empty the tank with the immediate release of the gas into the atmosphere or the channeling of the gas through tubes, without the excess flow device cutting in.

In a preferred embodiment, the movable obturator comprises a plunger having a head portion which supports the pressure-sensitive relief device or temperature sensitive relief device.

According to a preferred embodiment, the axis of the exit aperture is coaxial to the axis of the entry aperture. In this configuration, the plunger is therefore axially movable between a first rearward position (of an empty tank or fluid present at a pressure below a predefined low pressure value) and a second advanced position (presence of fluid at high pressure in the tank).

In one advantageous embodiment, the plunger is axially movable in a plunger seat made in the device body and the relief device is housed in a respective seat made in an inner passage of the plunger. In other words, the relief device is fixed in relation to the plunger and moves with it.

In one embodiment, the heat-sensitive relief element is a solid state alloy destined to melt at a predefined temperature.

In one embodiment variation, the heat-sensitive element is in a paste or liquid form and is contained in a casing susceptible to rupture when a predefined temperature is reached.

According to a preferred embodiment, the pressure sensitive element is in the form of a rupture diaphragm or disk which closes the passage aperture of the fluid and is therefore directly in contact with the high pressure fluid, orthogonal to the direction of the flow. Consequently, an increase in the pressure of the fluid beyond the predefined value is immediately perceived by the rupture disk and causes the desired rupture of the disk.

In one embodiment, the manual shut-off valve acts on a duct, the axis of which is radial to the plunger axis.

In one embodiment, the valve is composed mainly of a screwable element and by a sealing gasket. When fully screwed, air-tightness is provided and the gas is inhibited from flowing outside; when partially screwed the gas can be allowed to exit independently of the plunger and of the safety device described above and independently of the excess flow device which, as the above, is positioned in the main duct of the multipurpose valve.

BRIEF DESCRIPTION OF THE DRAWINGS

The characteristics and advantages of the present safety device will be more clearly comprehensible from the following description of its preferred embodiments, made by way of a non-limiting example, with reference to the appended drawings, wherein.

DETAILED DESCRIPTION OF THE PREFERRED EMBODIMENTS

Figure 1:
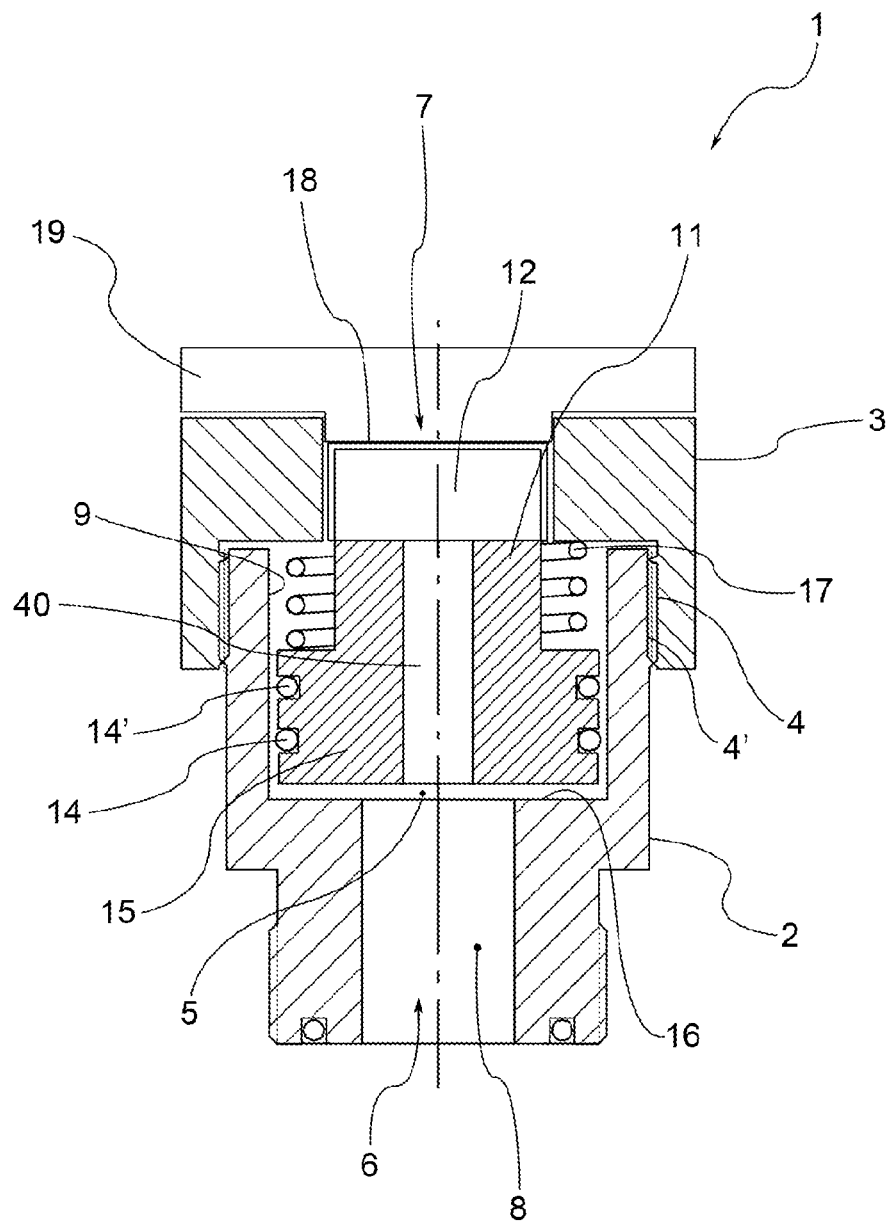
FIG. 1 shows, in axial cross-section, the present safety device applied to a valve, in a first embodiment which uses a heat-sensitive relief device.

In the drawings, reference numeral 1 globally denotes a safety device particularly for gas cylinders for self-propulsion systems.

The safety device 1 can be incorporated in a valve, for example a multipurpose valve for a cylinder containing high pressure gas for a self-propulsion gas system.

The safety device 1 comprises a device body which, in one embodiment, is composed of a first portion 2, suitable for being connected to the body of a multipurpose valve or directly to an opening of the cylinder or container, and a second portion 3 associated with first portion 2. Advantageously, the coupling between the two portions of the body occurs by means of respective threaded connection portions 4, 4'. Second portion 3 can therefore be removed from first portion 2 for the assembly and the maintenance of the inner components of the device which will be described below.

In its totality, the device body defines an inner chamber 5 having, on one side, an entry aperture 6 and, on the other, at least one exit aperture 7. Entry aperture 6, inner chamber 5 and exit aperture 7 form a body passage for the fluid. Entry aperture 6 is suitable for being placed in fluidic communication with the inside of a cylinder or container of the fluid (not shown), for example a self-propulsion gas, through entry duct 8, part of which is made inside the cylinder nozzle of the valve, not shown. Entry duct 8 and the passage for the fluid 6, 5, 7 together form a release duct for the fluid contained in the cylinder or container.

In a preferred embodiment, the axis of entry aperture 6 is coaxial to the axis of exit aperture 7.

The two portions 2, 3 of the device body jointly define a seat 9 in which an obturator comprising plunger 10 is axially movable. In one embodiment, seat 9 and plunger 10 are coaxial to entry 6 and exit apertures 7. Plunger 10 is crossed by an inner duct 40. Inner duct 40 forms, when open as described below, together with entry duct 8, entry and exit apertures 6, 7 and inner chamber 5, the release duct for the fluid contained in the cylinder or container.

The plunger 10 comprises a head portion 11 and a tail portion 15. With reference to FIG. 1, head portion 11 supports temperature-sensitive element 12 or with reference to FIG. 2, pressure-sensitive rupture diaphragm or disk 12', which is held in position by ring nut 13 screwed to head portion 11 of plunger 10.

Plunger 10 is axially movable between a first position, or rearward position, and a second position or advanced position. In both positions, the temperature-sensitive element 12 or rupture diaphragm 12' engage the inner duct 40 in an airtight manner so as to stop the flow of fluid through the device.

Plunger 10, movable inside its seat 9, engages the seat in an airtight manner by means of the interposition of at least one sealing gasket 14, 14' so as inhibit the passage of the flow of fluid between plunger 10 and the device body.

Sealing gasket 14, 14' is for example housed in the respective seat made in tail portion 15 of plunger 10.

When the pressure inside the tank is below a predefined safety threshold value, the plunger 10 is pushed by an elastic element 17, such as a coil spring, into a rearward position. In this condition, tail portion 15 is for example supported by a shoulder 16 made in first portion 2 of the device body.

When the pressure inside the tank exceeds the predefined safety threshold value, plunger 10 is pushed by the pressurised fluid into the advanced position. Spring 17 is suitably calibrated so as to permit the shift between the two positions described depending on the safety pressure value.

In one advantageous embodiment, head portion 11 of plunger 10 is covered by coloured cap 18 so as to make the position of plunger 10 and thus the presence of pressurised gas inside the tank more visible from the outside. Furthermore, a transparent or semi-transparent cover 19 can be attached to the free end of the device body, to protect the obturator and safety device.

In one embodiment, the temperature-sensitive relief device (FIG. 1) and the pressure-sensitive relief device (FIG. 2) are of the known type. The respective activation of such devices when a predefined temperature (generally 110° C.35 10° C.) or predefined pressure (generally 340 bar) is reached, permits the flow of fluid from entry aperture 6 toward exit aperture 7 through the inner duct 40.

Figure 3A:
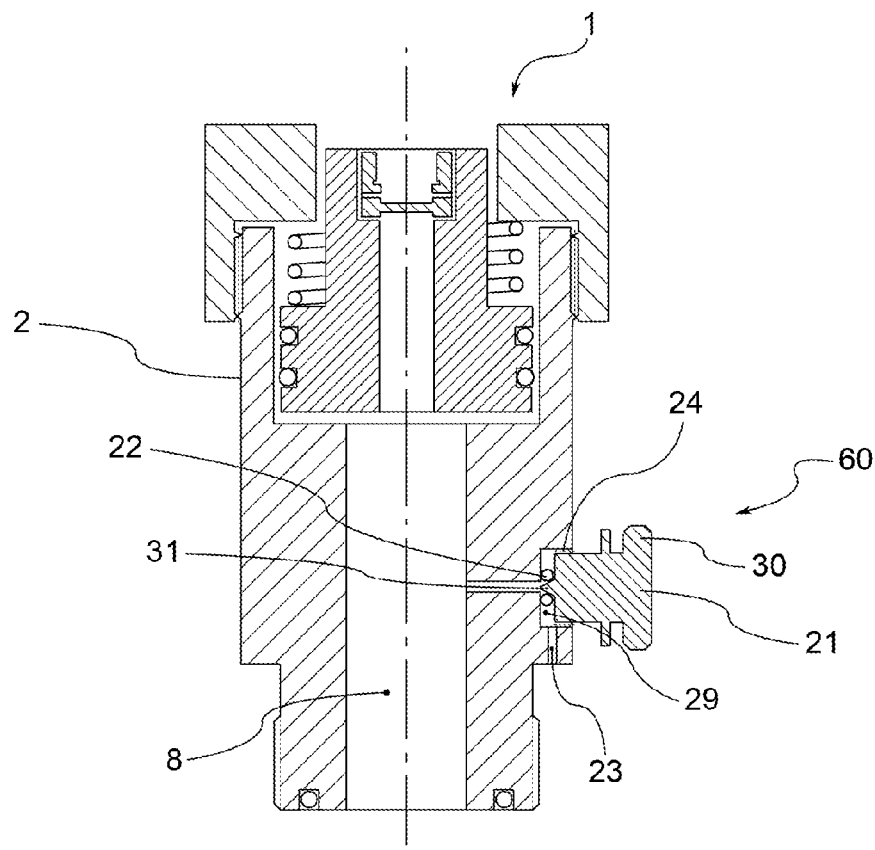
FIG. 3a shows, in an axial cross-section view, the device in FIG. 2 integrated with a manual opening/closing valve.

FIG. 3a shows the safety device described above and comprising a manual shut-off valve 60 associated with first portion 2 of the device body.

In particular, in second portion 2 of the device body there is a purge duct 20, preferably directed radially to the entry passage 8; purge duct 20 comes out in a purge chamber 29 connected with the outside through an exit duct 23. Purge chamber 29 comprises a threaded portion to which a screw 21 is screwed. Screw 21 comprises a head portion 30 and a stem portion 31. Head portion 30 is shaped so as to permit the manual rotation of the screw; stem portion 31 is shaped so as to house a sealing gasket 22 which engages the outlet of the purge duct 20 in the purge chamber 29 in an airtight manner.

By means of shut-off valve 60 it is possible, by partially unscrewing the screw 21, to allow the transit of gas from the purge duct 20 to the exit duct 23 with consequent exit of the gas into the atmosphere and emptying of the cylinder.

Figure 3B:
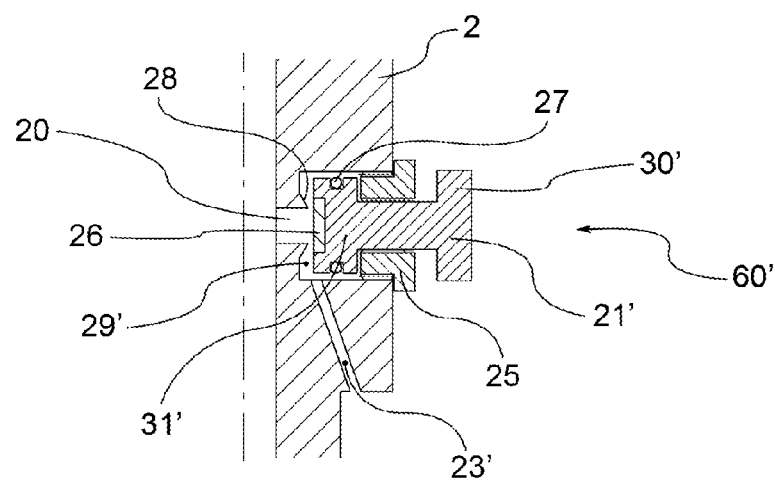
FIG. 3b shows, in a partial axial cross-section view, a second embodiment of the manual opening/closing valve.

FIG. 3b partially illustrates the safety device to which a different type of manual shut-off valve 60' is applied, particularly suitable for applications for self-propulsion gas systems where the gas is at high pressure.

The purge duct 20 comes out in a purge chamber 29' connected with the outside through the exit duct 23'. Purge chamber 29' is delimited by a wall which comprises a threaded portion to which a ring-nut 25 is screwed. Ring-nut 25 in turn comprises an inner threaded portion to which a pin 21' is screwed. Pin 21' comprises a head portion 30' shaped so as to permit the manual rotation of the pin 21' and a sealing portion 31' shaped so as to house a first sealing gasket 26, for example a flat gasket, and at least a second sealing gasket 27, preferably an O-ring. First sealing gasket 26 co-operates with a respective seal seat 28 made in the body of the device and facilitates, when the pin 21' is fastened, the closure of the purge duct 20 so that the fluid does not flow towards the exit duct 23'. The second sealing gasket 27 inhibits passage of fluid between the purge chamber 29' and the outside, through the passages between the pin 21' and/or the ring nut 25 and the body of the device.

Figure 2:
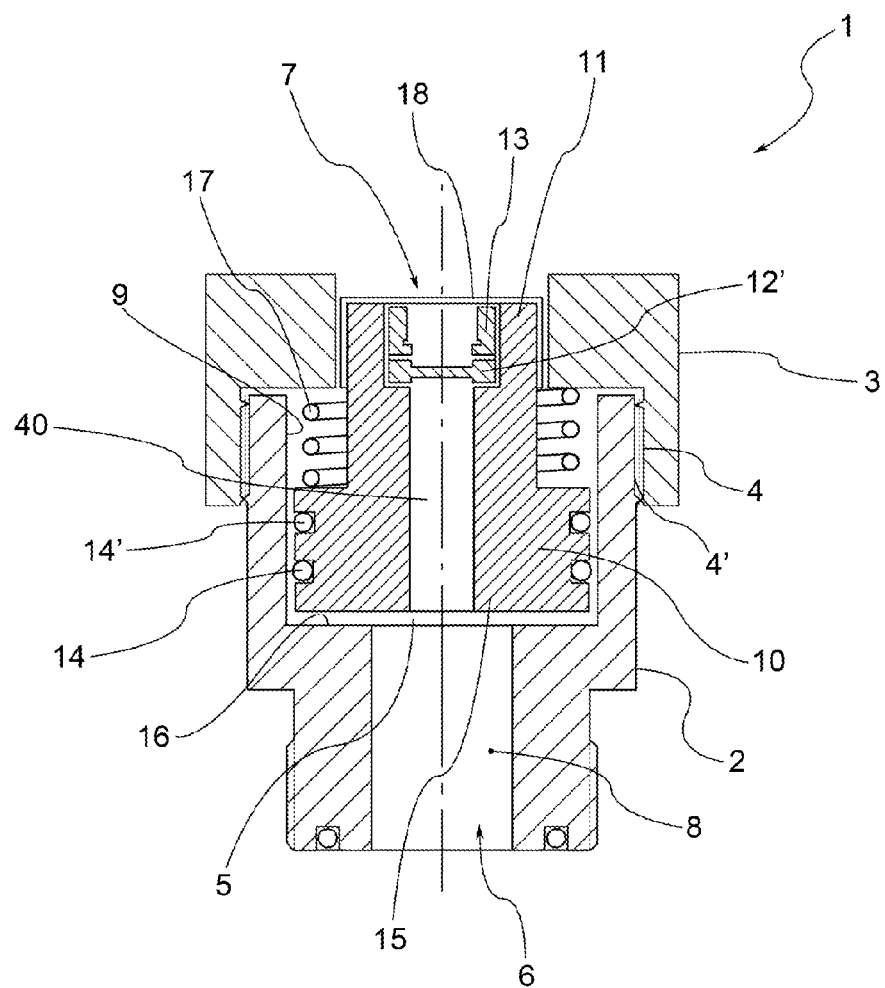
FIG. 2 shows, in axial cross-section, the safety device according to an embodiment variant which uses a pressure-sensitive relief device.

The incorporation of the manual shut-off valve 60, 60' in the safety device shown in FIGS. 1 and 2 makes it possible to empty the container or gas cylinder without the excess flow device cutting in. By manually unscrewing the screw or pin described, the passage of the fluid from the inside to the outside of the cylinder is permitted. The end part of the exit duct 23; 23' can even be shaped and/or threaded so as to be able to connect a tube to allow the gas to flow into a predetermined area or to be recuperated in another container of fluid.

The safety device is advantageously suitable for being connected, for example by means of a threaded portion, to a multipurpose valve of the known type. It is therefore interchangeable with the current safety devices.

Modifications and adaptations to the present safety device, for example replacing elements with others functionally equivalent elements so as to satisfy contingent requirements while remaining within the scope of the following claims. Each of the claims described as belonging to a possible embodiment can be realised independently of the other embodiments described.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A safety device for a cylinder holding gaseous fluids under pressure, comprising:
   a device body, in which a passage is defined for a fluid, said passage extending from an entry aperture, suitable for being placed in fluidic communication with said cylinder, to an exit aperture;
   an obturator airtightly engaging said passage and acting in a continuous manner depending on the fluid pressure, said obturator being movable from a first position, in which it indicates the presence of fluid at a pressure below a first predefined pressure threshold value inside said cylinder, and a second position, in which it indicates the presence of fluid at a pressure above said first predefined pressure threshold value inside said cylinder;
   at least one temperature and/or pressure-sensitive relief device positioned in said obturator in such a way that, upon exceeding a predefined temperature threshold or upon exceeding a second predefined pressure threshold, said relief device opens the passage for the fluid and permits the flow of fluid from said entry aperture towards said exit aperture independently of the position of the movable obturator; in that said exit aperture is open towards the outside environment and the obturator has a head which engages said exit aperture in such a way that when the obturator is in the first position, said head is hidden from sight, whereas when the obturator is in the second position, said head is visible from the outside.

2. The safety device according to claim 1, wherein said obturator is slidable along said passage between the first position and the second position, the obturator being urged by elastic means into said rearward position and being movable into said advanced position when pressure exerted by fluid in said cylinder exceeds force exerted by said elastic means.

3. The safety device according to claim 1, wherein the obturator is crossed by an inner duct in fluidic communication with said passage, said at least one relief device engaging said inner duct in an airtight manner.

4. The safety device according to claim 1 further comprising a heat-sensitive element which, when said predefined temperature threshold is exceeded, undergoes a change of state permitting said passage.

5. The safety device according to claim 4, wherein the heat-sensitive element is a solid state alloy adapted to melt at a predefined temperature.

6. The safety device according to claim 1 further comprising a pressure-sensitive element susceptible to rupture when the pressure difference upstream and downstream of said element exceeds a predefined value.

7. The safety device according to claim 6, wherein the pressure-sensitive element is in the form of a rupture diaphragm or disk.

8. The safety device according to claim 1, wherein the obturator comprises a hollow plunger coaxial to at least the entry aperture or exit aperture.

9. The safety device according to claim 1, further comprising a shut-off valve of the flow suitable for intercepting the flow of fluid coming from said cylinder upstream of the obturator.

10. The safety device according to claim 1, wherein said obturator has at least a portion that is of a different colour from said device body.

11. The safety device according to claim 1, further comprising a coloured cap attached to an end of said obturator that extends towards outside of said device body.

12. The safety device according to claim 1, further comprising a transparent or semi-transparent cover attached to said safety device and covering said obturator.

13. A multipurpose valve for a cylinder holding gaseous fluids under pressure comprising a safety device comprising:
   a device body, in which a passage is defined for a fluid, said passage extending from an entry aperture, suitable for being placed in fluidic communication with said cylinder, to an exit aperture;
   an obturator airtightly engaging said passage and acting in a continuous manner depending on the fluid pressure, said obturator being movable from a first position, in which it indicates the presence of fluid at a pressure below a first predefined pressure threshold value inside said cylinder, and a second position, in which it indicates the presence of fluid at a pressure above said first predefined pressure threshold value inside said cylinder;
   at least one temperature and/or pressure-sensitive relief device positioned in said obturator in such a way that, upon exceeding a predefined temperature threshold or upon exceeding a second predefined pressure threshold, said relief device opens the passage for the fluid and permits the flow of fluid from said entry aperture towards said exit aperture independently of the position of the movable obturator;
   said safety device being characterized in that said exit aperture is open towards the outside environment and wherein the obturator has a head which engages said exit aperture in such a way that when the obturator is in the first position, said head is hidden from sight, whereas when the obturator is in the second position, said head is visible from the outside.

14. The valve according to claim 13, wherein said obturator is slidable along said passage between the first position and the second position, the obturator being urged by elastic means into said first position and being movable into said second position when pressure exerted by fluid in said cylinder exceeds force exerted by said elastic means.

15. The valve according to claim 13, wherein the obturator is crossed by an inner duct in fluidic communication with said passage, said at least one relief device engaging said inner duct in an airtight manner.

16. The valve according to claim 13, further comprising a heat-sensitive element which, when said predefined temperature threshold is exceeded, undergoes a change of state permitting said passage; wherein the heat-sensitive element is a solid state alloy adapted to melt at a predefined temperature.

17. The valve according to claim 13 further comprising a pressure-sensitive element susceptible to rupture when the pressure difference upstream and downstream of said element exceeds a predefined value; wherein the pressure-sensitive element is in the form of a rupture diaphragm or disk.

18. The valve according to claim 13, wherein the obturator comprises a hollow plunger coaxial to at least the entry aperture or exit aperture.

19. The valve according to claim 13, further comprising a shut-off valve of the flow suitable for intercepting the flow of fluid coming from said cylinder upstream of the obturator.

20. The valve according to claim 13, wherein said obturator has at least a portion that is of a different colour from said device body.

\* \* \* \* \*